United States Patent
Young et al.

(10) Patent No.: US 6,543,660 B2
(45) Date of Patent: Apr. 8, 2003

(54) BICYCLE-MOUNTED ACCESSORY TRANSPORT SYSTEM

(76) Inventors: Allen C. Young, 4540 N. 44th St., Apt. #57, Phoenix, AZ (US) 85018; Paige E. Young, 4540 N. 44th St., Apt. #57, Phoenix, AZ (US) 85018

( * ) Notice: Subject to any disclaimer, the term of this patent is extended or adjusted under 35 U.S.C. 154(b) by 0 days.

(21) Appl. No.: 09/870,335

(22) Filed: May 30, 2001

(65) Prior Publication Data

US 2002/0179662 A1 Dec. 5, 2002

(51) Int. Cl.$^7$ ................................................ B62J 11/00
(52) U.S. Cl. ........................ 224/414; 224/425; 224/442; 224/926; 224/282
(58) Field of Search ............................... 224/414, 418, 224/425, 428, 434, 442, 443, 452, 453, 459, 461, 462, 926, 282; D12/411

(56) References Cited

U.S. PATENT DOCUMENTS

| | | | | | |
|---|---|---|---|---|---|
| 27,766 | A | * | 4/1860 | Fuller | .......................... 111/81 |
| 691,864 | A | * | 1/1902 | Jackson | ...................... 224/425 |
| 2,492,595 | A | * | 12/1949 | Rhoer | ........................ 224/414 |
| 4,071,175 | A | | 1/1978 | Wagnon | |
| 4,386,721 | A | | 6/1983 | Shimano | |
| 4,410,116 | A | * | 10/1983 | Mattei | ........................ 224/424 |
| 4,437,596 | A | | 3/1984 | Shook | |
| 4,640,449 | A | | 2/1987 | Blackburn | |
| 4,856,744 | A | | 8/1989 | Frankel | |
| 4,957,227 | A | | 9/1990 | Trimble | |
| 5,060,832 | A | | 10/1991 | Link | |
| 5,145,138 | A | | 9/1992 | Schlanger et al. | |
| 5,170,658 | A | * | 12/1992 | Thayer | ....................... 224/414 |
| 5,170,981 | A | | 12/1992 | Lin | |
| D332,240 | S | | 1/1993 | Schlanger et al. | |
| 5,217,116 | A | * | 6/1993 | Ku | ............................. 206/374 |
| D337,288 | S | | 7/1993 | Ringle' | |
| 5,326,006 | A | | 7/1994 | Giard, Jr. | |
| 5,392,971 | A | | 2/1995 | Hsu | |
| 5,423,509 | A | | 6/1995 | LaPorte et al. | |
| 5,426,570 | A | | 6/1995 | Davis | |
| 5,522,527 | A | | 6/1996 | Tsai | |
| 5,624,064 | A | | 4/1997 | McGee, Jr. | |
| 5,704,525 | A | | 1/1998 | Barro | |
| 5,788,134 | A | | 8/1998 | Matic, Jr. | |
| 5,810,228 | A | | 9/1998 | Brokering | |
| 5,839,632 | A | * | 11/1998 | Koday | ........................ 224/414 |
| 6,032,841 | A | | 3/2000 | Johnson | |
| 6,059,245 | A | | 5/2000 | Hermansen et al. | |

FOREIGN PATENT DOCUMENTS

JP          406206585 A   *   7/1994   ............... 224/32 R

* cited by examiner

*Primary Examiner*—Nathan J. Newhouse
(74) *Attorney, Agent, or Firm*—Schmeiser, Olsen & Watts LLP

(57) ABSTRACT

A bicycle accessory transport system having two stacked structures is disclosed. The structures are adapted to receive an accessory item such as a water bottle, a battery, or a repair kit and to hold such item securely and safely during a bike ride. The two structures are attached to each other in such a way that the back of the upper one is in contact with the front of the lower one, while the back of the lower one is attached to a suitable place on a bike frame. An item being inserted into the lower structure is guided into place by the back of the upper structure. In one embodiment of the invention, the spacing between the two structures may be varied by the user due to the presence of a pivot or other adjustment mechanism.

22 Claims, 7 Drawing Sheets

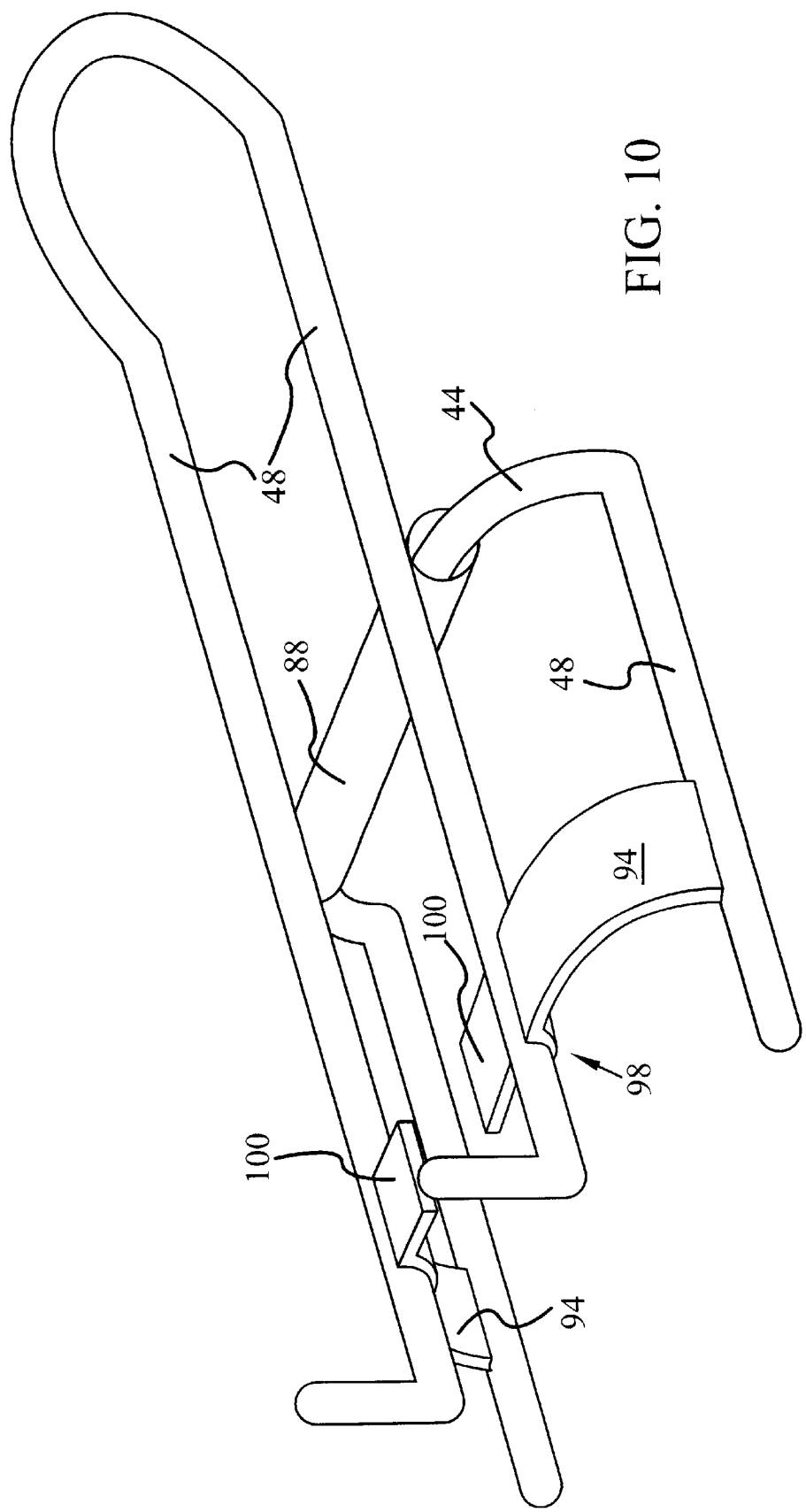

BICYCLE-MOUNTED ACCESSORY TRANSPORT SYSTEM

BACKGROUND OF THE INVENTION

1. Technical Field

This invention generally relates to a retention system adapted to hold an item on a moving bicycle, and more specifically relates to a retention system in which two adjacent structures are mounted to a bicycle.

2. Background Art

Bicycle riding is an activity engaged in world-wide for recreation, competition, and as a means of transportation. In the U.S. alone, 65 million people are thought to ride regularly. As with any physical activity, cycling consumes energy and causes the participant to perspire, thus requiring the cyclist who wishes to ride in comfort, compete at a high level, or remain on the bike for long distances or periods of time, to replace essential nutrients during the ride itself. This in turn requires that the cyclist carry with him on the bicycle water, a sports drink, or other such items as will replenish his energy and quench his thirst.

A further reason for bicycle storage and carrying capacity has come with the development of bicycle accessories such as head lamps, odometers, and other electrical devices whose operation depends on power supplied by a battery. A conventional battery pack lasts for about two hours, and the accessory powered by it often takes up one of the bottle holders. First aid and bike repair kits may also be desirable while riding a bike, and a way to comfortably, safely, and securely transport these items must be provided.

One solution to the problem of accessory transport is to mount a metal water bottle holder to the frame of a bicycle. These bottle holders work for batteries as well as water bottles because batteries have been developed that adopt the shape of a typical bike water bottle. Sometimes additional bottle holders are mounted to a second location on the bike frame. In this way an additional water bottle or other accessory may be taken along on a bike ride. These measures, however, do not adequately address the accessory transport problem. A bike frame offers limited space in which to mount a bottle holder, and the mounting locations convenient to a rider's reach are still more limited in number. If one or more of these few locations is devoted to, for example, a battery or a first aid kit, the rider is forced to make do with perhaps a single water bottle, and must therefore shorten the length and reduce the intensity of his rides.

The need for larger amounts of water has been addressed, with partial success, by hydration packs that may be worn on the back like a backpack. Yet these are very difficult to clean, especially after having been filled with a sticky sports drink, and thus are likely to harbor bacteria, mold, and other unwanted or dangerous substances. Hydration packs also are bulky and limit maneuverability.

DISCLOSURE OF INVENTION

Therefore, there existed a need to provide a bicycle-mounted accessory transport system that provides increased capacity and accessibility without limiting maneuverability and flexibility. According to an embodiment of the present invention, a bicycle accessory transport system comprises two stacked structures adapted to receive an accessory item such as a water bottle, a battery, or a repair kit and hold such item securely and safely during a bike ride. The two structures are attached to each other in such a way that the back of an upper one is in contact with the front of a lower one, while the back of the lower one is attached to a suitable location on a bike frame. An item being inserted into the lower structure is guided into place by the back of the upper structure. In one embodiment of the invention, the spacing between the two structures may be varied by the user due to the presence of a pivot or other adjustment mechanism.

The stacked transport system of the present invention increases a bicycle's accessory carrying capacity by adding an upper structure and thus utilizing otherwise wasted space. At the same time, the invention increases the accessibility of the accessories thus transported by locating them within a rider's reach, by taking advantage of their shape, which tends to encourage an item onto the proper entry/exit line, and by increasing adjustability, whether through a pivot mechanism, flexible materials, or otherwise, to allow a variation in the structure spacing. The system may be installed using the same procedure, tools, and hardware that are currently used for a single structure. Because the disclosed system allows a rider to carry more accessories than do previous systems, the invention makes possible longer, more strenuous, and thus more enjoyable and less frustrating rides.

Although the invention is generally described as a bicycle-mounted system above, it also has utility in other environments such as when mounted to a golf cart, on heavy machinery, on stationary exercise equipment like treadmills or exercise bikes, or any similar location where maximizing storage capacity in limited space is desirable. When mounted to a treadmill, for example, a runner may store more water or other accessories than would be possible without the invention, and the accessories would be accessible during the workout session.

The foregoing and other features and advantages of the invention will be apparent from the following more particular description of particular embodiments of the invention, as illustrated in the accompanying drawings.

BRIEF DESCRIPTION OF DRAWINGS

Particular embodiments of the present invention will hereinafter be described in conjunction with the appended drawings, where like designations denote like elements.

FIG. 10 is a perspective view of an embodiment of the present invention featuring a pivot mechanism and flex extension.

MODES FOR CARRYING OUT THE INVENTION

The present invention is a bicycle-mounted accessory transport system that provides increased capacity and accessibility. According to the invention, a bicycle accessory transport system comprises two stacked structures adapted to receive an accessory item such as a water bottle, a battery, or a repair kit and hold it securely and safely during a bike ride. The two structures are attached to each other in such a way that the back of an upper structure is in contact with the front of a lower structure, while the back of the lower structure is attached to a suitable location on a bike frame. An item being inserted into the lower structure is guided into place by the back of the upper structure. In one embodiment of the invention, the spacing between the two structures may be varied by the user due to the presence of a pivot or other adjustment mechanism.

Figure 1:
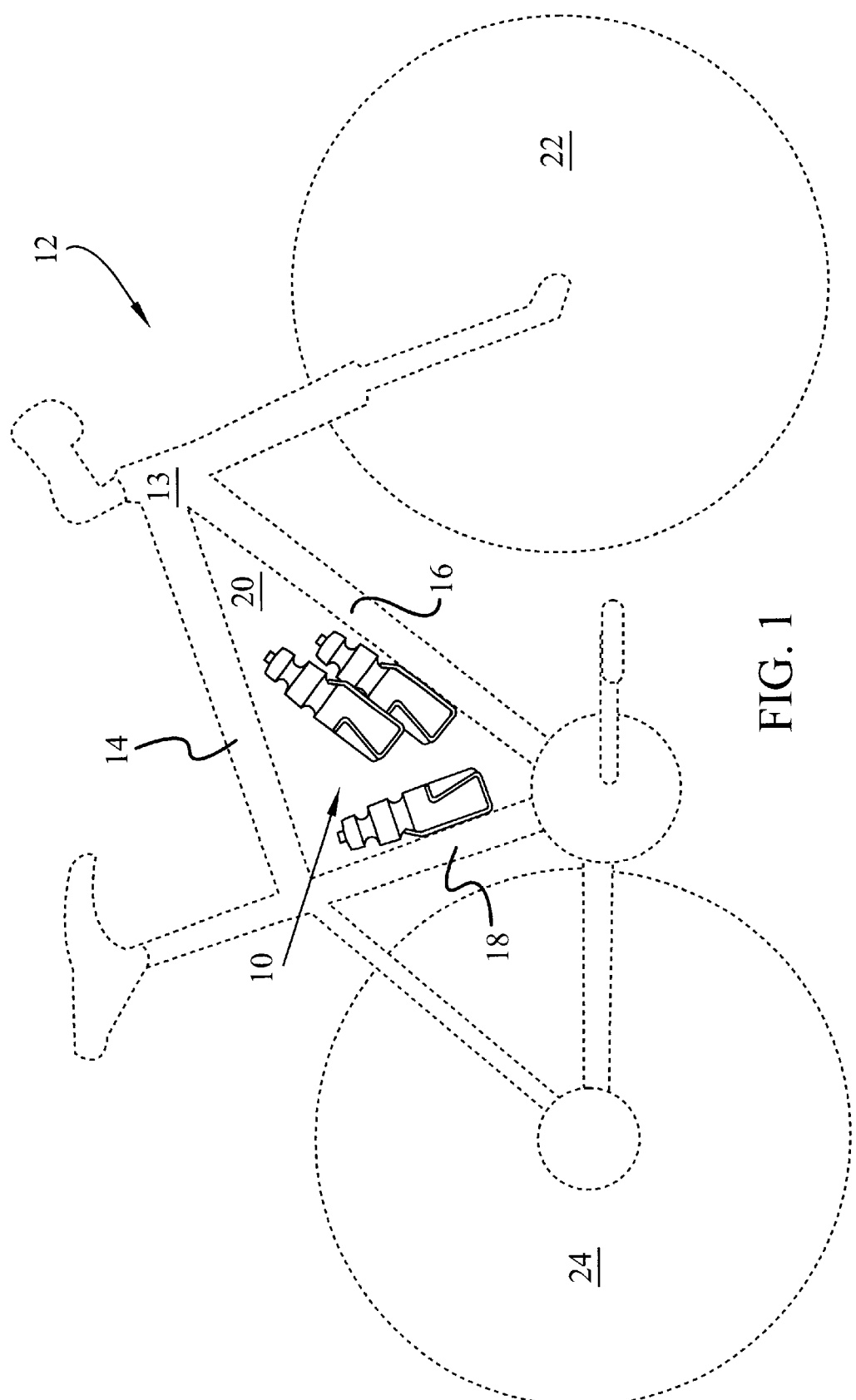
FIG. 1 is a plan view of an embodiment of the present invention showing one possible attachment location on a bicycle.

Referring now to the figures, and in particular to FIG. 1, an accessory transport system 10 according to the present invention is attached to a bicycle 12. Bicycle 12 has a frame 13 comprising a top tube 14, a down tube 16, and a seat tube 18. Bicycle 12 further includes a front wheel 22 and a rear wheel 24. Tubes 14, 16, and 18 define a triangular space 20 where accessory transport system 10 may advantageously be placed. Accessory transport system 10 may also be placed at other locations on frame 13 where space permits, as will be understood by those skilled in the art. For example, accessory transport system 10 may be placed on the underside of down tube 16, between tube 16 and wheel 22. Accessory transport system 10 may also be attached to a location on top tube 14 or on seat tube 18. Still other locations are also possible. On a conventional bicycle, such as bicycle 12, there is sufficient space within triangle 20 to mount both the transport system of the present invention and a separate, standard water bottle holder with sufficient space left over to maneuver the accessories into and out of system 10. It will of course be understood by those of ordinary skill in the art that the outline of the conventional bicycle shown in FIG. 1 is for exemplary purposes only and that the invention may be adapted to any bicycle with an appropriate mounting location.

By placing accessory transport system 10 somewhere within triangle 20, a rider of bicycle 12 makes use of space that would not otherwise be utilized. Currently-available accessory transport systems, having only a single structure in which to transport an item, leave unused a substantial portion of triangle 20. Accessory transport system 10 takes advantage of that space. Using the space of triangle 20 has the further advantage of being easily accessible to, meaning within easy reach of, the rider of bicycle 12.

To many bicycle riders, the weight of the bicycle and its accessories is an important concern, and lighter components are generally thought to be more desirable than heavier ones. In that regard, it is useful to point out that accessory transport system 10 may be manufactured to weigh less than would two single bottle holders welded together. According to an embodiment of the present invention, for instance, only one attachment mechanism 36 is included, whereas the combination of two single holders would include two such mechanisms. It should also be pointed out that the embodiments of the present invention are not simply a union of two single holders with one welded on top of the other. Rather, in a particular embodiment, as discussed herein, two stacked structures are offset from one another and adapted to possess a low profile and function together as a unit while adding only a small amount of additional weight to bicycle 12. The offset referred to is that, were system 10 removed from bicycle 12 and stood on end such that attachment mechanism 36 were perpendicular to the horizontal ground, the top of second structure 28 would be above the top of first structure 26. Said another way, structures 26 and 28, in the embodiment spoken of, do not line up but are staggered with respect to one another. This feature, as discussed above, allows a more compact system 10 than would otherwise be possible and eases the insertion and removal of accessories 50.

Figure 2:
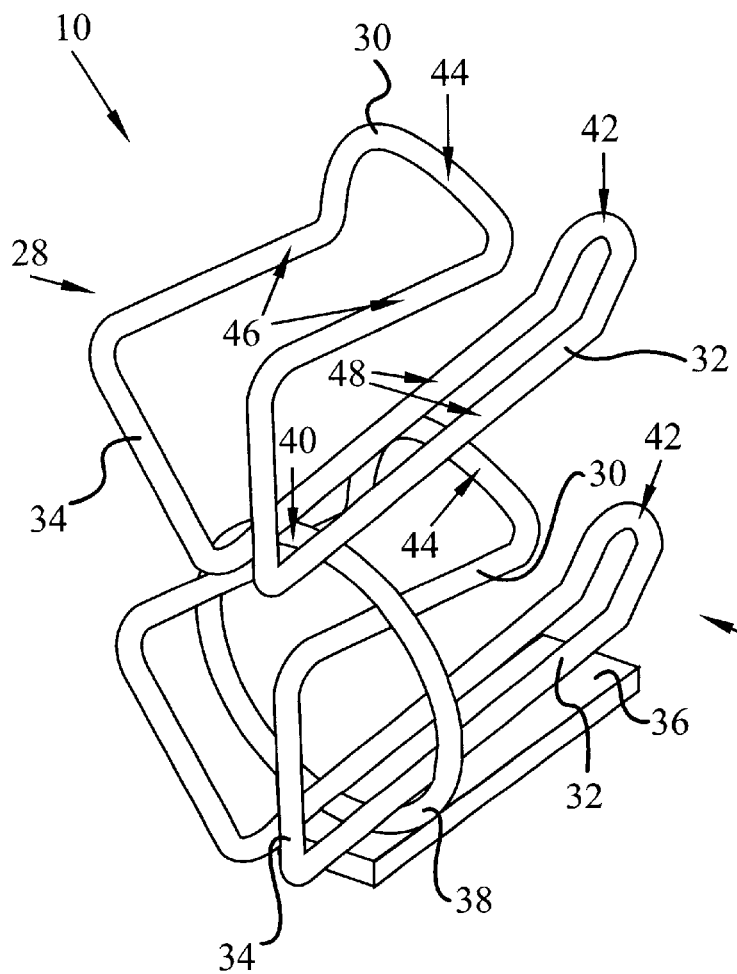
FIG. 2 is a perspective view of the present invention.

Referring now to FIG. 2, accessory transport system 10 has a first structure 26 and a second structure 28. In the embodiment shown in FIG. 2, first structure 26 and second structure 28 have several similar components. These include a front piece 30, a back piece 32, and a connecting piece 34. Back piece 32 has a rear top bar 42 and back bars 48, and front piece 30 has a front top bar 44 and front bars 46. Alternatively, first and second structures 26 and 28 may be formed to be dissimilar. Examples of other embodiments of accessory transport system 10 which comprise dissimilar first and second structures 26 and 28 will be discussed in connection with other figures below.

Referring still to FIG. 2, first structure 26 has an attachment mechanism 36 connected to back piece 32. Attachment mechanism 36 may take any of several forms, including that shown in this FIG. 2, namely, a rectangular block having therein one or more attachment apertures, not shown, welded to back piece 32 of first structure 26. Attachment mechanism 36 may also be attached to first structure 26 by any of several other methods, including straps, bolts, or other methods well known in the art. Attachment mechanism 36 may also contain attachment apertures of the keyhole type that allow attachment to corresponding protrusions, also not shown, on bicycle 12 without the use of tools. As mentioned above, attachment mechanism 36 may alternatively attach to bicycle 12 in some other way, such as with tie-on cords or straps, with a welded connection, with bolts or screws, or any other method. The particular method of attachment is unimportant, and all such methods should be understood to fall within the scope of the present invention. A further advantage of being able to remove transport structure 10 from bicycle 12 is that by doing so a rider may prevent the theft of system 10 from an unattended bicycle 12. Alternatively, some other ani-theft mechanism, such as a lock, could be employed.

First structure 26 in one embodiment includes a ring 38 that encircles first structure 26 by passing between back piece 32 and attachment mechanism 36 and over the top of front piece 30. One convenient location for ring 38 is roughly midway between connecting piece 34 and front top bar 44 of front piece 30 on first structure 26. Ring 38 offers a convenient location to which second structure 28 may be attached. The point where ring 38 and back piece 32 of second structure 28 meet comprises a contact location 40. This location may conveniently be located on back piece 32 of second structure 28 at or near connecting piece 34. Contact location 40 may comprise a welded connection or any other suitable attachment means. Contact location 40 may further comprise a pivot mechanism as will be further explained in connection with FIGS. 3 and 8–10.

Second structure 28 may in one embodiment be connected to ring 38 at a position such that second structure 28 is substantially centered between front bars 46 of front piece 30 on first structure 26. Placing second structure 28 at that location means that system 10 will lie as much as is possible in the place defined by triangle 20, thus giving accessory transport system 10 a compact, streamlined profile. This streamlining effect is advantageous because it reduces wind resistance and because it maintains sufficient clearance of the rider's legs and stays out of the way of trail or road obstacles that may pass close to bicycle 12.

Ring 38, when used, lends strength and support to system 10. It is possible, and within the intended scope of the present invention, to construct accessory transport system 10 without ring 38. Such an alternative is shown in FIG. 10, where a flex extension 94 takes the place of ring 38.

First structure 26 and second structure 28, including each of their components, may be made of a metal, such as a lightweight metal, i.e., aluminum or an aluminum alloy, which may for convenience and comfort be covered with a cushioning material such as plastic. In their general dimensions and construction, structures 26 and 28 are each similar to the single water bottle holders well known in the art.

In one embodiment, front piece 30 of first and second structures 26 and 28 includes a pair of front bars 46. Front bars 46 may be spaced apart a distance of two or three inches so as to securely hold, by virtue of supplying pressure over a relatively large distance, an accessory inside structures 26 and 28. Back piece 32 likewise may include a pair of back bars 48. Back bars 48 are advantageously spaced apart to a lesser degree than front bars 46, perhaps at a distance of less than one inch. This close spacing provides a sturdy back support for an accessory carried within structures 26 and 28. Rear top bar 42 of back piece 32 contributes to the accessibility of accessory transport system 10 by acting as a guide for an accessory being inserted into structures 26 and 28. In one embodiment, first structure 26 may include a ramp, not shown in the figures, that extends from rear top bar 42 towards down tube 16 and which may ease the entry of accessory 50 into first structure 26.

In order to fit inside structures 26 or 28, an accessory will likely have a roughly cylindrical shape, as will be further explained in connection with FIG. 3. The accessory will thus tend to first contact structure 26 or 28 at or near rear top bar 42, after which the accessory may be guided down back bars 48 until it is fully housed in structure 26 or 28. However, as will be clear to one of ordinary skill in the art, one or more of the first or second structures 26 and 28 may be configured to receive and securely hold accessories of shapes other than cylindrical such as rectangular, square, triangular, oval, and even unsymmetrical shapes without departing from the nature of the teachings herein.

Connecting piece 34 typically comprises, like front piece 30 and back piece 32, a pair of connecting pieces 34, which may be parallel to each other or which may lie at an angle with respect to each other as is shown in FIG. 2. Because, as mentioned above, the most common accessories will likely have a roughly cylindrical shape with a diameter greater than about one and a half inches, connecting pieces 34 may advantageously be spaced apart by distances of up to an inch and a half, although greater distances may also be appropriate for certain accessories.

Figure 3:
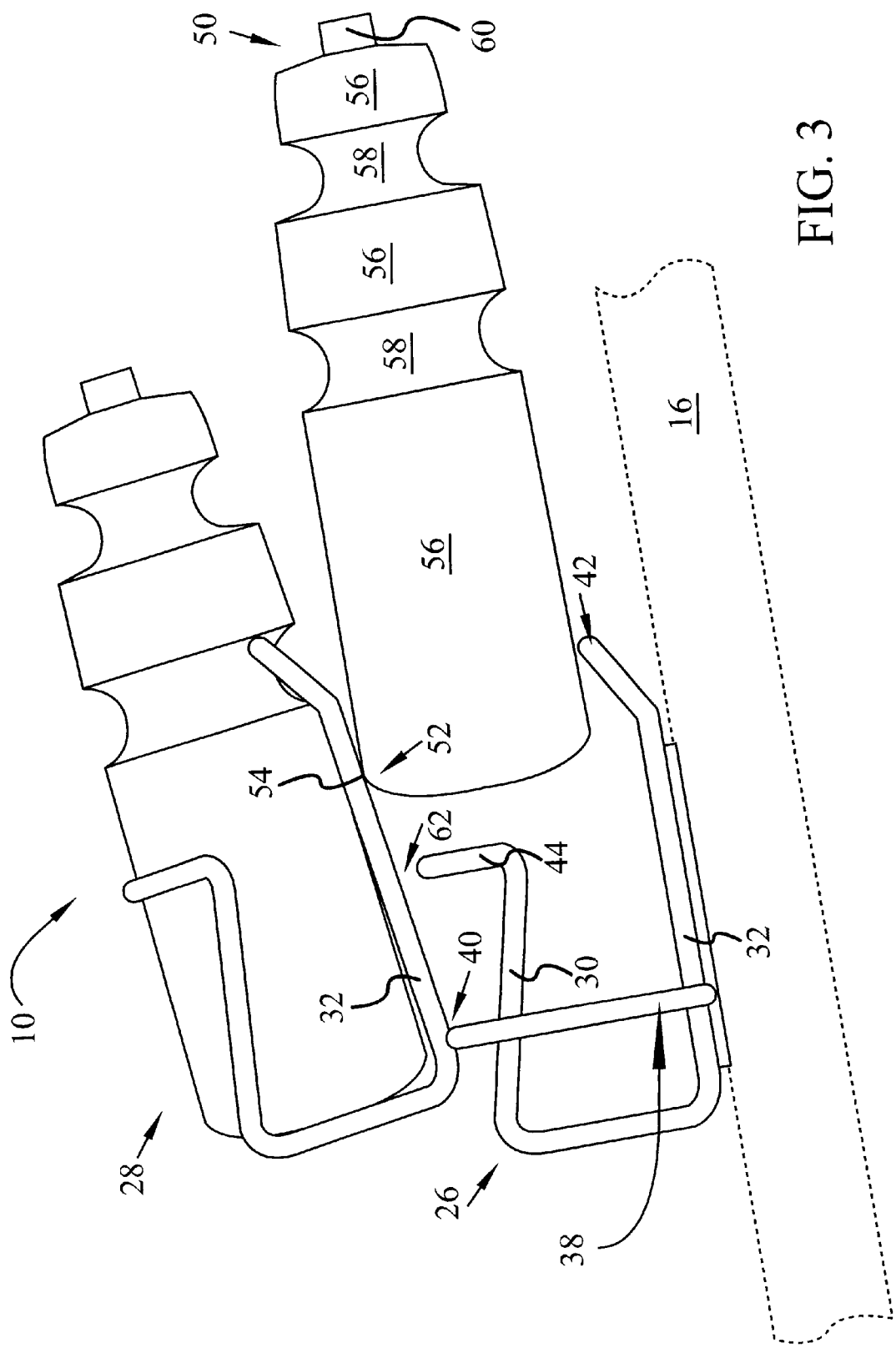
FIG. 3 is a side view of the invention showing an accessory partially inserted in the lower structure.
Figure 4:
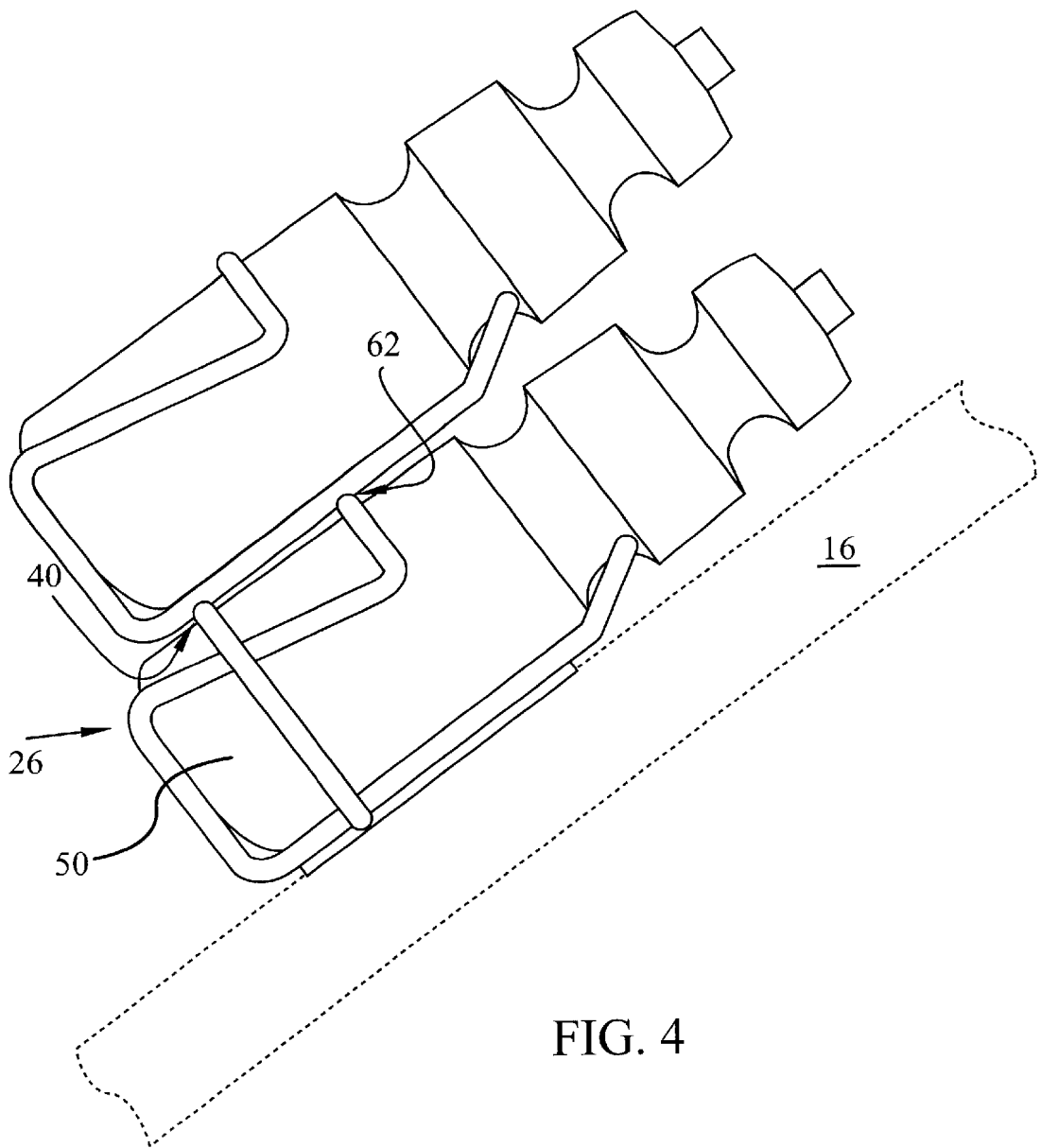
FIG. 4 is the side view of FIG. 3 showing the accessory fully inserted in the lower structure.

FIG. 3 depicts an accessory 50 partially inserted into first structure 26 of accessory transport system 10. A lower corner 52 of accessory 50 is generally the first part of accessory 50 to make contact with system 10 during the insertion process. This first contact occurs at or near a first contact point 54. Back piece 32 of second structure 28 then guides accessory 50 into position between front piece 30 and back piece 32 of first structure 26, from which position accessory 50 may then be fully inserted into first structure 26. This guiding action is possible because of the absence of an attachment mechanism 36 (shown in FIG. 2) on second structure 28. This represents a further advantage, in addition to the weight reduction mentioned above, of an embodiment of the present invention over a potential system wherein two conventional single bottle holders are welded in a stacked fashion.

Accessory 50 will typically be a water bottle, a battery, or a structure in which other items may be carried. When accessory 50 is a water bottle or a battery it advantageously possesses a shape similar to that shown in FIG. 3, where at least one recessed area 58 separates body segments 56. Recessed areas 58 increase the ease and security with which accessory 50 is grasped, both by a person and by structures 26 and 28, by providing a convenient and comfortable place in which may rest, respectively, a person's fingers and rear top bar 42. A nozzle 60 is located at one end of accessory 50 to permit water or other liquid to exit. Nozzle 60 may, in some embodiments of accessory 50, be unnecessary and in that case may be omitted.

Figure 8:
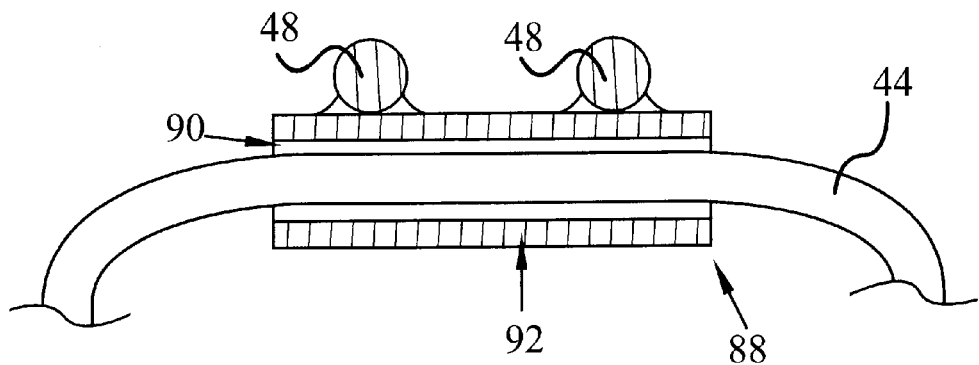
FIG. 8 is a sectional view of an embodiment of the pivot mechanism.

In order to increase the ease with which accessories 50 are placed in and removed from structures 26 and 28, the spacing between structure 26 and 28 may, in certain embodiments of system 10, be varied by the user. This capability will now be explained, having reference to FIGS. 8–10, and still to FIG. 3. In FIG. 3, second structure 28 is shown in a pivoted position, and contact location 40 is depicted as the pivot point about which second structure 28 is rotated. The actual pivot mechanism is not shown in FIG. 3, but FIG. 8 depicts an embodiment of the pivot mechanism, as further explained below. It should understood, however, that the invention also contemplates a stacked structure system without a pivot mechanism of any kind.

FIG. 8 shows one embodiment of the pivot mechanism wherein a pivot sleeve 88 is formed on and rolls around front top bar 44 of first structure 26. FIG. 3, in contrast, while not showing pivot sleeve 88, depicts its location as being on ring 38. Either of these locations for pivot sleeve 88, as well as others, are within the intended scope of the invention. Pivot sleeve 88 includes a hollow interior 90 surrounded by a cylindrical body 92. Hollow interior 90 may be sized to snugly engage front top bar 44 or it may, as shown in FIG. 8, have a diameter larger than the outside diameter of front top bar 44. The diameter of hollow interior 90 will determine the ease with which pivot mechanism 88 pivots about front top bar 44. Back bars 48 of second structure 28 appear in FIG. 8 attached to pivot mechanism 88. The connection between back bars 48 and pivot mechanism 88 may advantageously be formed by welding, although any joining practice may also be used.

Figure 9:
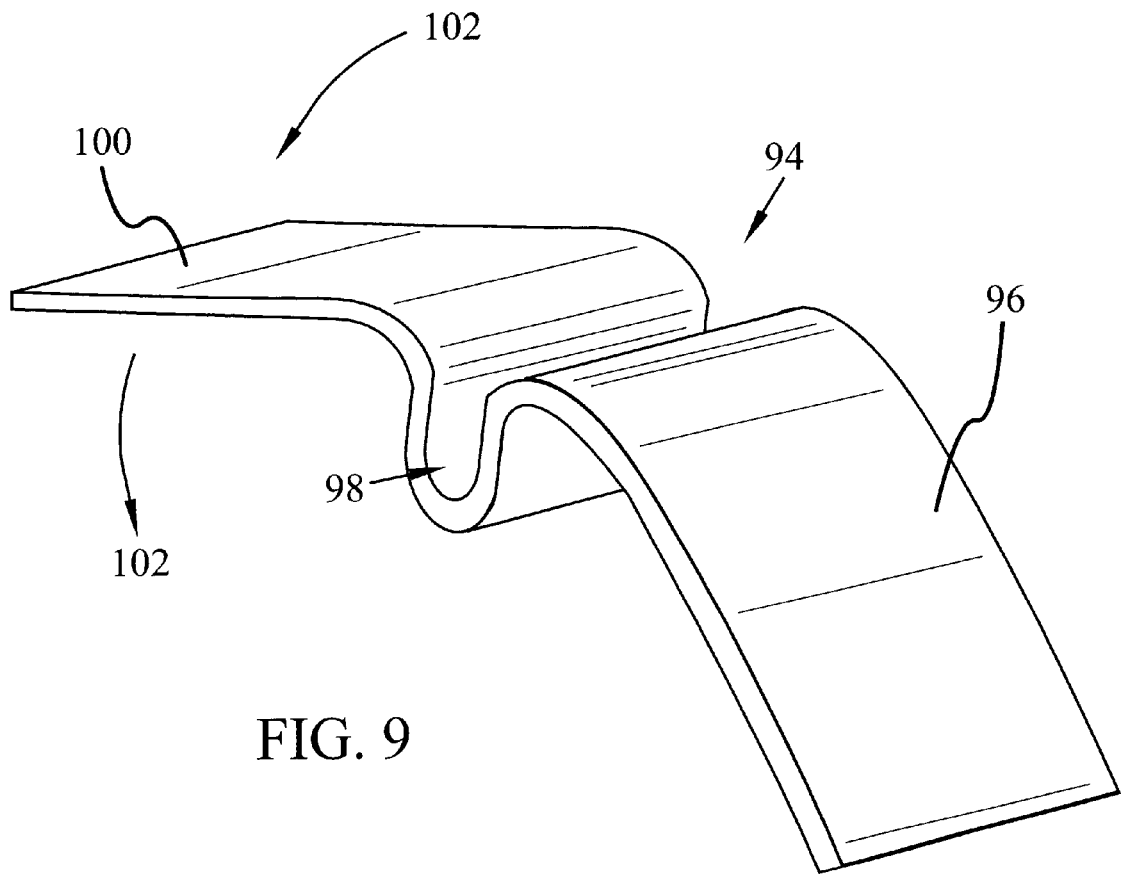
FIG. 9 is a view of an embodiment of a flex extension.

Referring now particularly to FIGS. 9 and 10, a flex extension 94 has a fixed side 96, a groove 98, and a free side 100. When pressure is applied to flex extension 94, it flexes in the direction indicated by arrows 102. When the pressure is discontinued, flex extension 94 relaxes by moving in the direction opposite that indicated by arrows 102. Fixed side 96 of flex extension 94 attaches, by any known manner as discussed above, to back bar 48 of first structure 26. Back bar 48 of second structure 28 rests in groove 98, and free side 100 extends out beyond back bar 48 of second structure 28 towards the other back bar 48 on second structure 28. If desired, two flex extensions 94 may be used, one attached to each back bar 48 of first structure 26, but this is not a necessary feature of the invention. Just one or even no flex extension 94 may be used, as desired. Alternatively, free side 100 may be attached to back bar 48 of second structure 28, with groove 98 located between back bar 48 of second structure 28 and back bar 48 of first structure 26 rather than providing a location in which back bar 48 of second structure 28 may rest. Fixed side 96 may in this embodiment be attached, as in the embodiment described above, to back bar 48 of first structure 26. Flex extension 94 may then flex to allow second structure 26 to pivot. Other embodiments, as will be apparent to those of ordinary skill in the art, are also possible.

Flex extension 94 both gives support to second structure 28 and provides the necessary flexibility to allow second structure 28 to be displaced when pivot mechanism 88 is rotated about front top bar 44. The embodiments shown offer just one example of how these goals may be accomplished, and it will be understood that other pivoting mechanisms and flexibility providers are also possible.

The pivoting action referred to above enables accessory transport system 10 to be constructed such that it may fit, if desired, within the limited space available inside triangle 20 of FIG. 1 yet still allow accessory 50 to be easily inserted into and removed from first structure 26. Structures 26 and 28 may, in one embodiment of the invention, be sufficiently spaced apart so as to accommodate the insertion and removal of accessory 50 with respect to first structure 26 without a pivoting motion. A rider of bicycle 12 may cause second structure 28 to pivot about contact location 40 by simply applying pressure to back piece 32 of second structure 28, either by manually manipulating back piece 32 or by manipulating it indirectly through pressure applied by accessory 50 during its insertion or removal.

Figure 5:
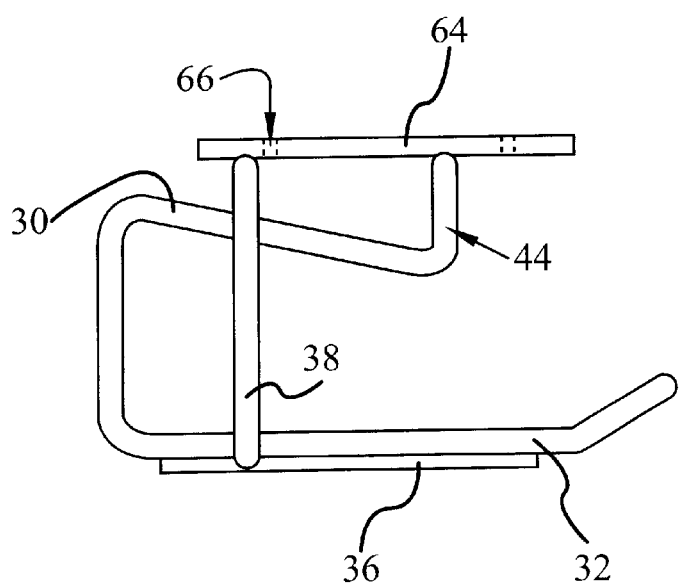
FIG. 5 is a side view of an alternate embodiment of the present invention.

In FIG. 5, first structure 26 is shown having attachment mechanism 36 attached to back piece 32 and a loading plate 64 attached to front piece 30. Loading plate 64 may be attached to front piece 30 at ring 38 and front top bar 44, although other attachment locations are contemplated. At least one threaded insert 66 forms a part of loading plate 64, and serves as an attachment location for an accessory 50, not shown. When mounted at threaded inserts 66 to loading plate 64, an accessory 50 may be conveniently transported in tandem with another accessory 50, also not shown. Examples of accessories contemplated for attachment to loading plate 64 include a pump, a bag, a light, a battery pack, or any of several other possibilities.

Figure 6:
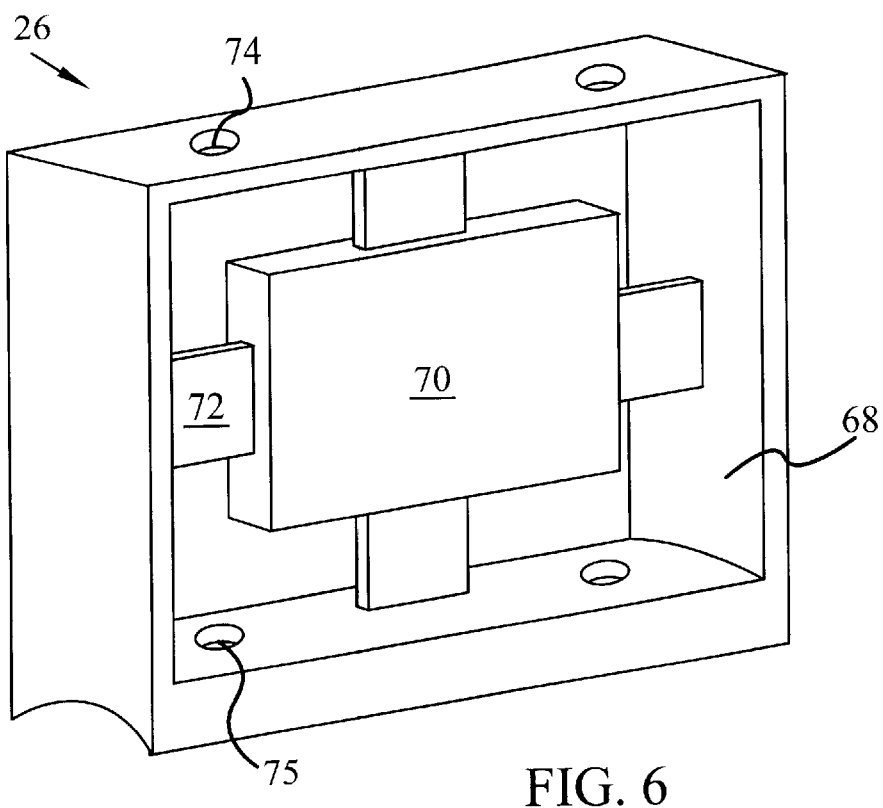
FIG. 6 is a perspective view of another alternate embodiment of the invention.

Referring now to FIG. 6, an alternate embodiment of first structure 26 is shown where an extender 68 may be attached at a suitable location to bicycle 12 using frame mounting apertures 75. Extender 68 comprises four walls that form the perimeter of a cavity within which may be placed a reflector 70, held in place by fins 72. Reflector 70 may be formed of plastic so as to reduce its weight, or of any other reflective material. Fins 72 may or may not be formed of or coated with reflective material. Reflector 70 and fins 72 are not an essential feature of extender 68, and may be included or omitted as desired. Reflector 70 may also be replaced by a flashing light, which, if used, would greatly increase safety by providing a warning of the presence of bicycle 12 to those at either side regardless of their ability to illuminate a reflector. Reflector 70 may also be replaced by a storage container such as a bag for small objects. Accessory mounting apertures 74 are located in extender 68 opposite frame mounting apertures 75. Accessory mounting apertures 74 may be used to attach an accessory 50, or accessory holder, not shown, to extender 68 in accordance with the stacking concept of the present invention.

Extender 68 is useful in those instances where ease of access to accessory 50 is important, and is particularly useful where transport system 10 is attached to down tube 16 of bicycle 12. Extender 68 raises accessory 50 up away from down tube 16 and closer to a point within easy reach of a rider of bicycle 12. While this may offer advantages in all kinds of riding situations, the convenient positioning is especially useful on large-frame bikes where the dimensions are such that a normal mounting position would complicate access to accessories 50, and in racing situations where riders must keep their eyes on the trial or road as much as possible and cannot afford to glance down at an out-of-the-way storage structure that can't be accessed easily.

Figure 7:
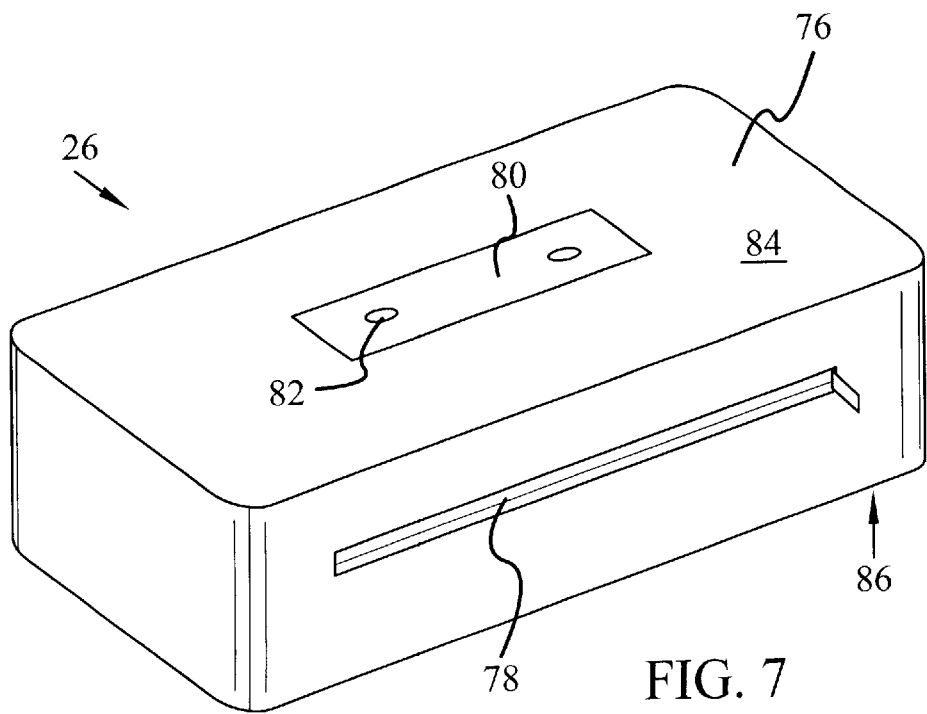
FIG. 7 is a perspective view of yet another alternate embodiment.

FIG. 7 depicts yet another embodiment of first structure 26 wherein a bag 76 has a zipper 78 allowing access to the interior of bag 76 where any number of useful items small enough to fit inside may be stored, for example a first aid or a tire repair kit, bike repair tools, a wallet, rain poncho, etc. A bag-mounted loading plate 80 may be attached to upper surface 84 of bag 76 for the purpose of mounting an additional accessory 50 to the top of bag 76. The additional accessory 50 may be mounted to bag 76 at bag apertures 82.

As with the other embodiments of first structure 26 already described, bag 76 may be mounted to frame 13 of bicycle 12 shown in FIG. 1 at any suitable location, including, advantageously, on down tube 16. Bag 76 is thus mounted to frame 13 at a lower surface 86 of bag 76, using any known method. Lower surface 86 is not visible in the figure. Zipper 78 may of course be replaced by any other fastening device, such as snaps or velcro, which fastening devices are well known in the art.

While the invention has been particularly shown and described with reference to preferred embodiments thereof, it will be understood by those skilled in the art that various changes in form and details may be made therein without departing from the spirit and scope of the invention. This fact has been referred to in various places throughout the foregoing description.

We claim:

1. A stacked structure transport system adapted to securely and safely maintain an accessory item on a bicycle while said bicycle is in motion, said transport system comprising:
    (1) a first structure adapted to receive and retain a first accessory item at least a portion of which is cylindrically shaped having a height greater than its diameter, said first structure configured for secure attachment to said bicycle by an attachment mechanism located on a first side of said first structure; and
    (2) a second structure adapted to receive and retain a second accessory item at least a portion of which is cylindrically shaped having a height greater than its width, said second structure mounted on said first structure at a second side of said first structure opposite said first side, each of said first and second structures further includes a back piece, a front piece and a connecting piece, each said connecting piece extending between the back piece and the front piece of each of the first and second structure.

2. The transport system of claim 1 wherein said first and second structures are receptacles each defining a storage space adapted for the receipt and retention of said cylindrically shaped portion of said item on said bicycle.

3. The transport system of claim 1 wherein each of said back pieces comprising a pair of bars having a first length and said front piece comprising a pair of bars having a second length, said first length greater than said second length, said connecting piece extending between said front piece and said back piece.

4. The transport system of claim 3 wherein said second structure is offset from said first structure.

5. The transport system of claim 1 wherein said second structure is mounted to said first structure such that said second structure is adjustable relative to a position of an opening of said first structure between at least a first position and a second position.

6. The transport system of claim 5 wherein said second structure is pivotably mounted to said first structure at a pivot point.

7. The transport system of claim 6 wherein said second structure is configured to pivot about said pivot point such that a portion of said second structure is adjustable alternately closer to and farther away from a portion of said first structure.

8. The transport system of claim 6 wherein said pivot point comprises a pivot sleeve attached to said second structure, said sleeve adapted to pivot around a portion of said first structure when said second structure pivots on said first structure, said sleeve comprising an elongated tube open at both ends.

9. The transport system of claim 5 wherein at least a portion of said first or second structures is constructed of a flexible material.

10. The transport system of claim 9 further comprising a flex extension attached at a first location to said first structure and at a second location to said second structure.

11. The transport system of claim 1 wherein said first structure includes a support extending from said first side to said second side, said support coupled to said first structure at said second side.

12. The transport system of claim 1 further comprising a support coupled between the first structure and said second structure.

13. The transport system of claim 1 wherein said first and second structures are each configured to accept at least one of a water bottle and a battery.

14. The transport system of claim 1 wherein a first side of said second structure is coupled to said second side of said first structure, said second structure having at least one loading plate on a second side of the second structure opposite the first side of the second structure, said loading plate having at least one hole therethrough for mounting an accessory item.

15. A stacked structure transport system adapted to securely and safely maintain an item on a bicycle while said bicycle is in motion, said transport system comprising:
  (1) a first receptacle including a back piece comprising a pair of bars having a first length and a front piece comprising a pair of bars having a second length, said first length greater than said second length, said front and back pieces connected by at least one connecting piece, said first receptacle securely attached to said bicycle by an attachment mechanism located at or near said back piece of said first receptacle; and
  (2) a second receptacle including a front piece comprising a pair of bars having said second length and a back piece comprising a pair of bars having said first length, said front and back pieces connected by at least one connecting piece, said second receptacle pivotably mounted on said first receptacle such that at least a portion of said back piece of said second receptacle is in pivotable contact at a contact location with at least a portion of said front piece of said first receptacle, and such that said second receptacle is offset from said first receptacle,
wherein said receptacles are adapted for the receipt and retention of said item on said bicycle.

16. A stacked water bottle carrier system for a bicycle adapted to securely and safely maintain at least two water bottles on a bicycle while the bicycle is in motion, the carrier system comprising:
  a first water bottle carrier having a mounting bracket configured to mount a first side of the first carrier securely to a bicycle, and a first water bottle retainer coupled to the mounting bracket and adapted to receive and retain a first water bottle; and
  a second water bottle carrier coupled to a second side of the first carrier opposite the first side, the second water bottle carrier having a second water bottle retainer adapted to receive and retain a second water bottle.

17. The stacked water bottle carrier system of claim 16, wherein the second water bottle carrier is coupled to the first water bottle carrier through a pivot configured such that an opening of the second water bottle retainer is pivotable closer to and farther away from an opening of the first water bottle retainer.

18. The stacked water bottle carrier system of claim 16, wherein the second water bottle carrier is oriented in a direction substantially in common with the first water bottle carrier, the second water bottle carrier including a water bottle receiving opening offset from a water bottle receiving opening of the first water bottle carrier.

19. The stacked water bottle carrier system of claim 16, wherein the second water bottle carrier is oriented in a direction substantially in common with the first water bottle carrier, the first and second water bottle carriers each having respective water bottle receiving openings, wherein the second water bottle carrier is adjustably mounted to the first water bottle carrier such that a relative location of the water bottle receiving opening of the second water bottle carrier may be adjusted with respect to a relative location of the water bottle receiving opening of the first water bottle carrier.

20. The stacked water bottle carrier system of claim 16, wherein the first water bottle carrier is coupled to an extender which causes the first water bottle carrier to mount to the bicycle in a position within easier reach of a rider of the bicycle than without the extender.

21. The stacked water bottle carrier system of claim 16, further comprising a support coupled between the first water bottle carrier and the second water bottle carrier.

22. The stacked water bottle carrier system of claim 21, wherein the support is coupled to the first water bottle carrier at its first end and its second end, and is coupled to the second water bottle carrier at an end where the second water bottle carrier is coupled to the first water bottle carrier.

* * * * *